United States Patent
Nakano et al.

(10) Patent No.: US 11,311,970 B2
(45) Date of Patent: Apr. 26, 2022

(54) SHIELDING GAS NOZZLE FOR METAL FORMING AND LASER METAL FORMING APPARATUS

(71) Applicant: Mitsubishi Electric Corporation, Tokyo (JP)

(72) Inventors: Yoshikazu Nakano, Tokyo (JP); Hidetaka Katogi, Tokyo (JP); Akiyoshi Sawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/438,469

(22) PCT Filed: Apr. 16, 2019

(86) PCT No.: PCT/JP2019/016281
§ 371 (c)(1),
(2) Date: Sep. 13, 2021

(87) PCT Pub. No.: WO2020/213051
PCT Pub. Date: Oct. 22, 2020

(65) Prior Publication Data
US 2022/0088712 A1 Mar. 24, 2022

(51) Int. Cl.
*B33Y 30/00* (2015.01)
*B22F 12/53* (2021.01)
(Continued)

(52) U.S. Cl.
CPC ........... *B23K 26/342* (2015.10); *B22F 10/22* (2021.01); *B22F 12/70* (2021.01); *B23K 26/1476* (2013.01); *B33Y 30/00* (2014.12)

(58) Field of Classification Search
CPC . B33Y 30/00; B22F 12/53; B23K 26/12–127; B23K 26/14–1476; B23K 9/12–122
See application file for complete search history.

(56) References Cited

U.S. PATENT DOCUMENTS

| 6,555,779 B1 * | 4/2003 | Obana ................. B23K 26/146 |
| | | 219/121.63 |
| 11,213,920 B2 * | 1/2022 | Stempfer ................ B22F 3/105 |

(Continued)

FOREIGN PATENT DOCUMENTS

| JP | 2004-9096 A | 1/2004 |
| JP | 2010-172941 A | 8/2010 |

(Continued)

OTHER PUBLICATIONS

International Search Report and Written Opinion dated Jul. 16, 2019, received for PCT Application PCT/JP2019/016281, Filed on Apr. 16, 2019, 7 pages including English Translation.

*Primary Examiner* — Michael A Laflame, Jr.
(74) *Attorney, Agent, or Firm* — Xsensus LLP

(57) ABSTRACT

A shielding gas nozzle for metal forming includes a wire feed line being a path to feed a wire at an inclination angle θ, a first gas ejection hole to jet a shielding gas at an angle equal to or less than the inclination angle θ, and a second gas ejection hole to jet the shielding gas in a direction different from that of the first gas ejection hole. The first gas ejection hole jets the shielding gas toward an intersection along a direction in which the absolute value of the angle to the wire feed direction is less than 90 degrees, and the second gas ejection hole jets the shielding gas toward the intersection along a direction in which the absolute value of the angle to the wire feed direction when viewed in the direction perpendicular to the base material surface is greater than 90 degrees.

20 Claims, 8 Drawing Sheets

(a) Diagram viewed in the direction perpendicular to the base material surface (in the Z-axis direction)

(b) Diagram viewed in the direction parallel to the base material surface (in the X-axis direction)

(51) Int. Cl.
*B23K 26/12* (2014.01)
*B23K 26/14* (2014.01)
*B23K 26/342* (2014.01)
*B22F 12/70* (2021.01)
*B22F 10/22* (2021.01)

(56) References Cited

U.S. PATENT DOCUMENTS

| | | | |
|---|---|---|---|
| 2005/0109744 A1* | 5/2005 | Baker | B23K 26/10 219/121.84 |
| 2008/0210675 A1* | 9/2008 | Sasaki | B23K 26/16 219/121.84 |
| 2015/0239058 A1* | 8/2015 | Buescher | B23K 9/1675 219/74 |
| 2018/0147667 A1* | 5/2018 | Lin | B23K 26/142 |
| 2018/0178304 A1* | 6/2018 | Pucek | B23K 35/0205 |
| 2019/0061053 A1* | 2/2019 | Yang | B23K 26/10 |
| 2019/0118291 A1* | 4/2019 | Nakagawa | B23K 26/1488 |
| 2020/0094342 A1* | 3/2020 | Terada | B23K 26/1464 |
| 2020/0376584 A1* | 12/2020 | Gao | G01S 15/06 |
| 2021/0252622 A1* | 8/2021 | Liu | B23K 26/348 |

FOREIGN PATENT DOCUMENTS

| | | |
|---|---|---|
| JP | 2014-36995 A | 2/2014 |
| JP | 2016-168621 A | 9/2016 |
| JP | 2017-127893 A | 7/2017 |

\* cited by examiner (a) Diagram viewed in the direction perpendicular to the base material surface (in the Z-axis direction)

(b) Diagram viewed in the direction parallel to the base material surface (in the X-axis direction)

(a) Diagram viewed in the direction perpendicular to the base material surface (in the Z-axis direction)

(b) Diagram viewed in the direction parallel to the base material surface (in the X-axis direction)

(a) Diagram viewed in the direction perpendicular to the base material surface (in the Z-axis direction)

(b) Diagram viewed in the direction parallel to the base material surface (in the X-axis direction)

(a) Diagram viewed in the direction perpendicular to the base material surface (in the Z-axis direction)

(b) Diagram viewed in the direction parallel to the base material surface (in the X-axis direction)

(c) Diagram viewed in the direction parallel to the base material surface (in the Y-axis direction)

(a) Diagram viewed in the direction perpendicular to the base material surface (in the Z-axis direction)

(b) Diagram viewed in the direction parallel to the base material surface (in the X-axis direction)

(c) Diagram viewed in the direction parallel to the base material surface (in the Y-axis direction)

SHIELDING GAS NOZZLE FOR METAL FORMING AND LASER METAL FORMING APPARATUS

CROSS-REFERENCE TO RELATED APPLICATION

The present application is based on PCT filing PCT/JP2019/016281, filed Apr. 16, 2019, the entire contents of which are incorporated herein by reference.

TECHNICAL FIELD

The present disclosure relates to a shielding gas nozzle for metal forming used for laser metal forming and a laser metal forming apparatus.

BACKGROUND TECHNOLOGY

Laser metal forming is a technology that uses laser light with high energy density as a heat source to melt a metal forming material and forms beads made of the melted forming material in a processing area; there is an apparatus that performs laser metal forming by using a wire-like forming material (hereinafter, simply referred to as "wire"). The processing area is an area where the wire is heated and melted and beads are freshly deposited; the processing area is developed on a base material surface or the beads already deposited. If the forming material is heated and melted in the air to form the beads on the processing area, the beads and the base material are oxidized due to the heat applied for heating and melting and the oxygen contained in the air. To cope with this, shielding gas that prevents such oxidation is supplied to the processing area and its vicinity. As the shielding gas, for example, an inert gas such as argon (Ar) or nitrogen ($N_2$) is used. Generally, in the metal forming using the shielding gas, the beads and the base material are cooled and the processing area is shielded from the surrounding air by jetting the shielding gas from a gas nozzle. This treatment prevents the beads and the base material from oxidation. A technology similar to the above is disclosed in Patent Document 1.

PRIOR ART LITERATURE

Patent Documents

[Patent Document 1] Japanese Patent Application Laid-Open No. 2010-172941

SUMMARY OF THE INVENTION

Problems to be Solved by the Invention

If a shielding gas supply axis, representing the direction for jetting the shielding gas, and a wire feed axis, representing the direction for feeding the wire, are not coaxial, then in the processing area behind the wire with respect to the jet direction of the shielding gas, the shielding gas is blocked by the wire, and as a result, the supply of the shielding gas is interrupted. This makes the antioxidation difficult. Hereinafter, the area behind the wire is referred to as "shadow area".

The purpose of the present invention is to obtain a shielding gas nozzle for metal forming that can prevent the oxidation of the beads and the base material occurring during the laser metal forming using a wire material.

Means to Solve the Problems

To solve the above-mentioned problems and achieve the purpose, the shielding gas nozzle for metal forming according to the present disclosure includes: a wire feed line being a path to feed a wire at an inclination angle θ to a base material surface; a first gas ejection hole to jet shielding gas for preventing oxidation of beads at an angle equal to or less than the inclination angle θ to the base material surface; and a second gas ejection hole to jet the shielding gas to the base material surface in a direction different from the jet direction of the first gas ejection hole. The shielding gas nozzle for metal forming has an intersection of the wire feed direction in which the wire is fed, the central axis direction of the first gas ejection hole, and the central axis direction of the second gas ejection hole at a position lower than the first gas ejection hole and the second gas ejection hole. The first gas ejection hole jets the shielding gas toward the intersection along a direction in which the absolute value of the angle to the wire feed direction when viewed in the direction perpendicular to the base material surface is less than 90 degrees; the second gas ejection hole jets the shielding gas toward the intersection along a direction in which the absolute value of the angle to the wire feed direction when viewed in the direction perpendicular to the base material surface is greater than 90 degrees.

Effects of the Invention

The shielding gas nozzle for metal forming according to the present disclosure can ensure air shielding during the laser metal forming using a wire material, so that it is possible to prevent the oxidation of the beads and the base material.

MODES FOR CARRYING OUT THE INVENTION

Hereinafter, shielding gas nozzles for metal forming and laser metal forming apparatuses according to the embodiments of the present disclosure will be described in detail with reference to the drawings. The invention, however, is not limited by these embodiments.

Embodiment 1

Figure 1:
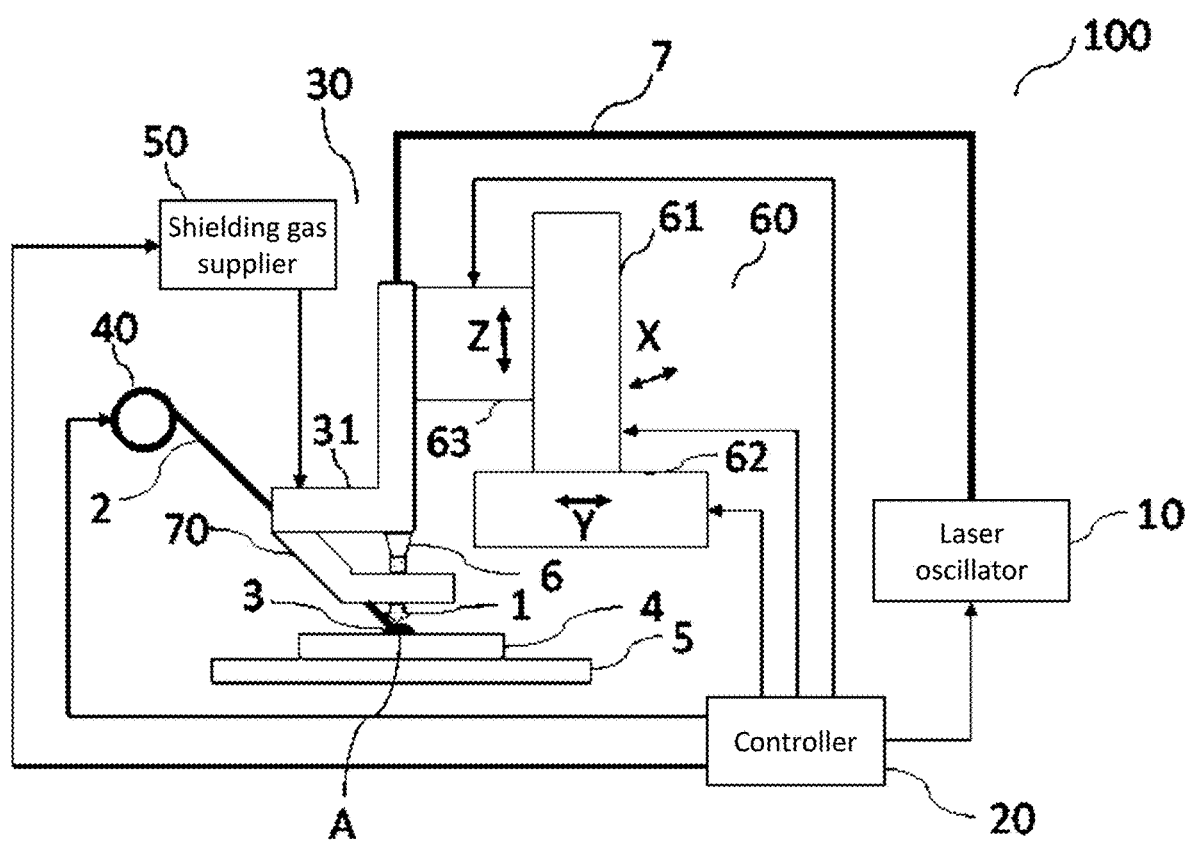
FIG. 1 is a schematic diagram showing a configuration of a laser metal forming apparatus according to Embodiment 1.

FIG. 1 is a schematic diagram showing a configuration of a laser metal forming apparatus 100 according to Embodiment 1 of the present disclosure. The laser metal forming apparatus 100 heats and melts a wire 2 with laser light 1 so as to deposit beads 3 on a processing area A on a base material surface. A base material 4 is placed on a stage 5. The laser metal forming apparatus 100 includes a laser oscillator 10, a controller 20, a processing head 30, a wire feeder 40, a shielding gas supplier 50, a drive unit 60, and the stage 5. The processing head 30 includes a processing-head's main body 31, which is equipped with a shielding gas nozzle 70 for metal forming and a laser head 6. The wire feeder 40 supplies the wire 2 to the shielding gas nozzle 70 for metal forming. The shielding gas supplier 50 supplies shielding gas to the shielding gas nozzle 70 for metal forming. The shielding gas nozzle 70 for metal forming feeds the wire 2 supplied from the wire feeder 40 to the processing area A, and jets the shielding gas to the processing area A. The laser oscillator 10 outputs the laser light 1 to the laser head 6 via a light transmission path 7. The laser head 6 radiates the laser light 1 received via the light transmission path 7 toward the processing area A. The drive unit 60 includes: a Z-axis driver 63, which moves the processing head 30 in the Z-axis (vertical) direction; an X-axis driver 61, which moves the processing head 30 in the X-axis direction perpendicular to the Z-axis direction; and a Y-axis driver 62, which moves the processing head 30 in the Y-axis direction perpendicular to the Z-axis direction and the X-axis direction. With this configuration, the processing head 30 is moved to a designated position. The controller 20 controls the laser oscillator 10, the wire feeder 40, the shielding gas supplier 50, and the drive unit 60 so as to deposit the beads 3 in a desired processing area A.

Figure 2:
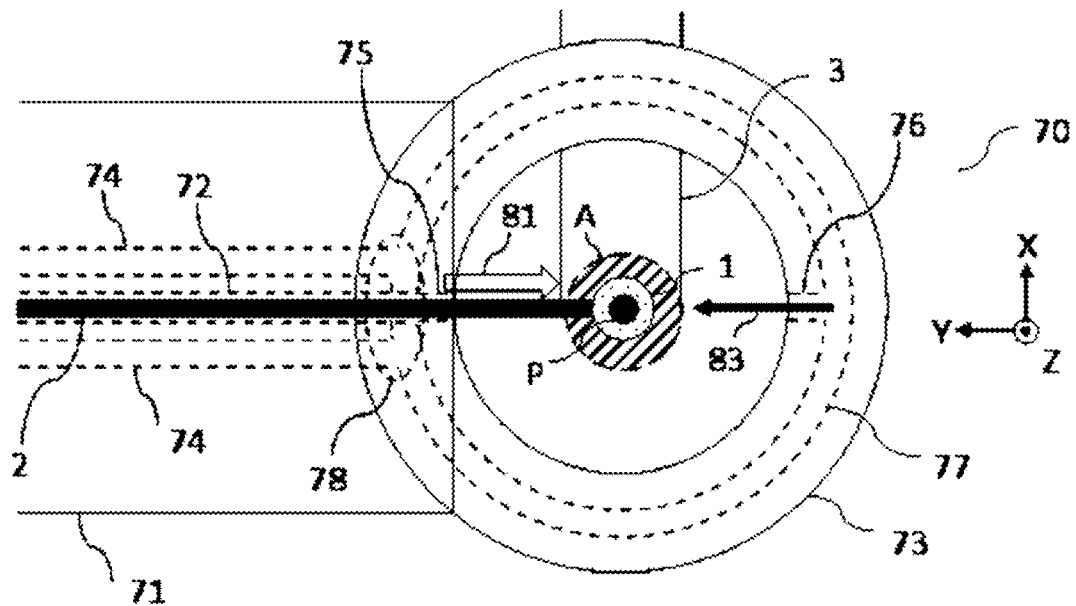
FIG. 2 is a schematic diagram of a shielding gas nozzle for metal forming according to Embodiment 1.
Figure 2:
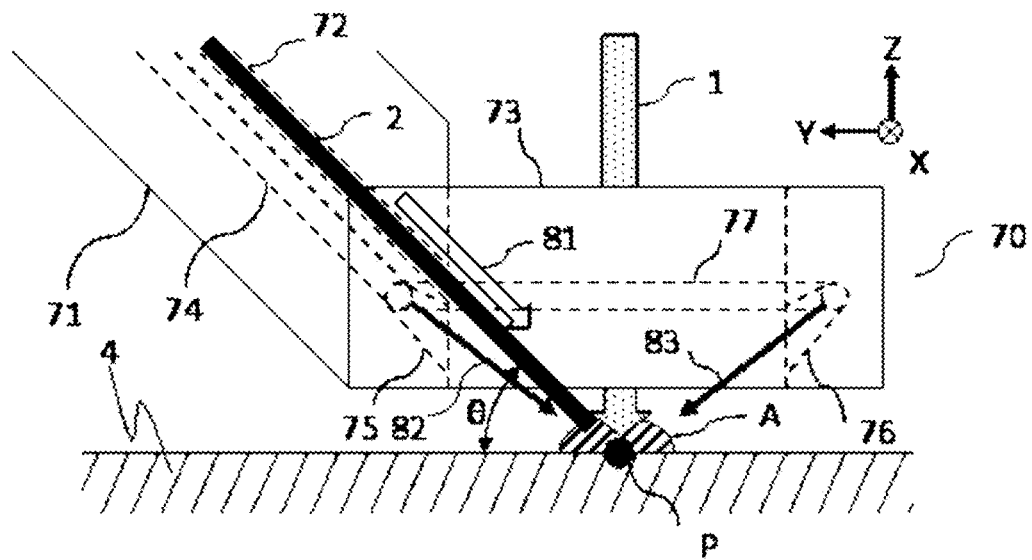

FIG. 2 is a schematic diagram of the shielding gas nozzle 70 for metal forming according to Embodiment 1 of the present disclosure. FIG. 2(a) is a diagram viewed in the direction perpendicular to the base material surface (in the Z-axis direction shown FIG. 1); FIG. 2(b) is a diagram viewed in the direction parallel to the base material surface (in the X-axis direction shown in FIG. 1). The nozzle 71 includes a wire feed line 72 and first gas supply lines 74. The wire feed line 72 is a path to feed the wire 2 to the processing area A at an inclination angle θ with respect to the base material surface on which the beads 3 are to be formed. The first gas supply lines 74 are routes to supply the shielding gas to a gas branching unit 73. The gas branching unit 73 branches the shielding gas supplied via the first gas supply lines 74 and jets the branched shielding gas toward the processing area A from a plurality of directions. The end of the nozzle 71 is connected to the ring-shaped gas branching unit 73 provided with a first gas ejection hole 75 and a second gas ejection hole 76 for jetting the shielding gas toward the processing area A. The gas branching unit 73 is internally provided with a branched gas supply line 77, which is a route for branching and supplying the shielding gas to the first gas ejection hole 75 and the second gas ejection hole 76. The branched gas supply line 77 is connected to the first gas supply lines 74 in the nozzle 71 at gas branching spot 78. In FIG. 2, two routes of the first gas supply lines 74 are provided; this is because if the first gas ejection hole 75 is provided on an extension line of a first gas supply line 74 on its outlet side, the shielding gas supplied from the first gas supply lines 74 directly flows into the first gas ejection hole 75, and a flow rate difference between the shielding gas jetted form the first gas ejection hole 75 and the shielding gas jetted form the second gas ejection hole 76 is likely to occur; to solve this problem, the extension line of the first gas supply line 74 and the extension line of the first gas ejection hole 75 are configured so as not to overlap each other; but a plurality paths of the first gas supply lines 74 are not necessarily required if the problem can be solved otherwise.

Figure 3:
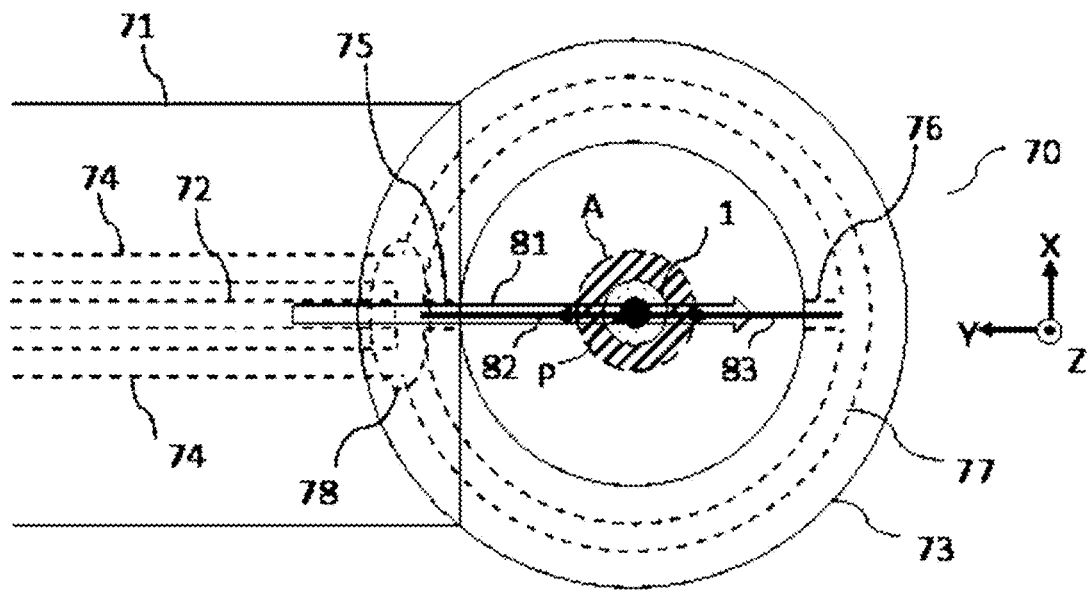
FIG. 3 is a schematic diagram explaining a positional relationship between a processing area and an intersection according to Embodiment 1.
Figure 3:
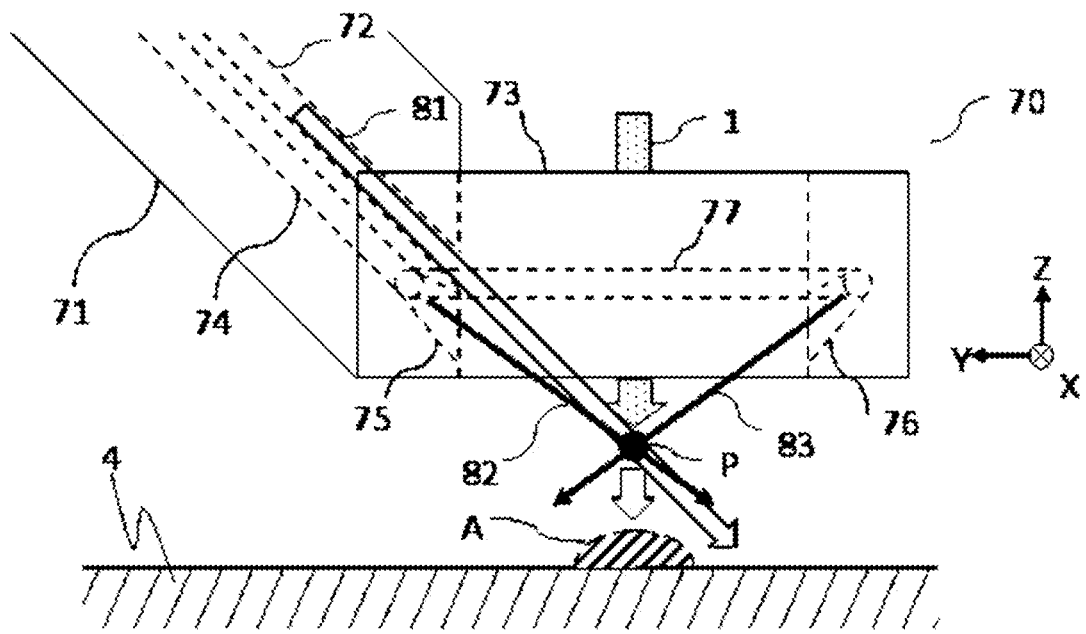

In Embodiment 1 of the present disclosure, the wire feed line 72, the first gas ejection hole 75, and the second gas ejection hole 76 are formed in such a way that a wire feed direction 81 along which the wire 2 is fed, a central axis direction 82 of the first gas ejection hole 75, and a central axis direction 83 of the second gas ejection hole 76 intersect with each other at a point (intersection P) which is lower than the first gas ejection hole 75 and the second gas ejection hole 76. The central axis direction 82 of the first gas ejection hole 75 and the central axis direction 83 of the second gas ejection hole 76 are each the central axis direction of the jet direction of the shielding gas jetted from their respective gas ejection holes. In addition, the laser head 6 is provided in such a way that the laser light 1 is also radiated toward the intersection P. FIG. 3 is a schematic diagram explaining a positional relationship between the processing area A and the intersection P. FIG. 3(a) shows a positional relationship between the processing area A and the intersection P viewed in the direction perpendicular to the base material surface (in the Z-axis direction shown in FIG. 1); FIG. 3(b) shows a positional relationship between the processing area A and the intersection P viewed in the direction parallel to the base material surface (in the X-axis direction shown in FIG. 1). The intersection P is preferably positioned in such a way that the pressure of the shielding gas blowing along the central axis direction of the first gas ejection hole 75 and the pressure of the shielding gas blowing along the central axis direction of the second gas ejection hole 76 are equal at the intersection P. Their positional relation, however, is not limited to this. In Embodiment 1 of the present disclosure, the wire feed line 72, the first gas ejection hole 75, and the second gas ejection hole 76 are formed in such a way that the intersection P is positioned at or close to the center of the gas branching unit 73 of a ring shape when viewed in the direction perpendicular to the base material surface. In other words, the gas branching unit 73 has a ring shape centered on the intersection P when viewed in the direction perpendicular to the base material surface. When the laser metal forming is performed, the position of the shielding gas nozzle 70 for metal forming is controlled in such a way that the intersection P is brought in the processing area A and the laser beam 1 is radiated toward the intersection P; this enables deposition of the beads 3 by feeding the wire 2 to the desired processing region A and supply of the shielding gas from plural directions to the deposited beads 3. It is assumed, hereinafter, that the metal forming is performed in a state where the intersection P exists in the processing area A as the result of the position control to the shielding gas nozzle 70 for metal forming. Thus, the jetting of the shielding gas from the first gas ejection hole and the second gas ejection hole toward the intersection is, from time to time, described as simply jetting the shielding gas toward the processing area A.

Figure 4:
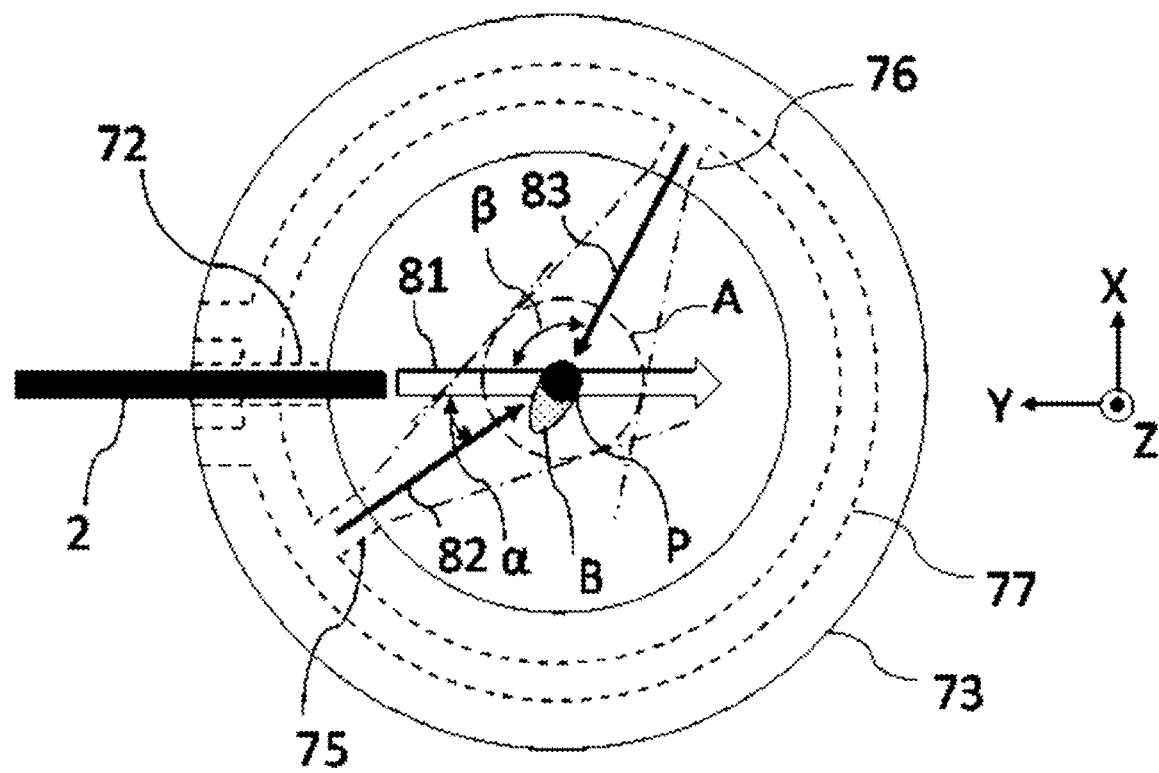
FIG. 4 is a schematic diagram explaining a positional relationship of gas ejection holes provided to the shielding gas nozzle for metal forming according to Embodiment 1.

Also, of the outlets of the first gas ejection hole 75 and the second gas ejection hole 76, at least the outlet of the first gas ejection hole 75 is formed closer to the base material surface than the position of the outlet of the wire feed line 72 in such a way that the shielding gas is jetted toward the intersection at an angle equal to or less than the inclination angle θ with respect to the base material surface. The shapes of the first gas ejection hole 75 and the second gas ejection hole 76 are preferably widened toward their respective outlets in such a way that the beads 3, including their vicinity, formed on the processing area A are shielded with the shielding gas. In Embodiment 1, the first gas ejection hole 75 is formed directly below the wire feed line 72 when viewed in the direction perpendicular to the base material surface, and the second gas ejection hole 76 is formed 180 degrees opposite to the first gas ejection hole 75 across the processing area A. However, this is an example, and their positional relationship is not limited to this. The only requirement here is that the first gas ejection hole 75 is provided in the gas branching unit 73 in such a way that the shielding gas is jetted toward the intersection P in a direction whose angle, in the absolute value, to the wire feed direction 81 is less than 90 degrees when viewed in the direction perpendicular to the base material surface and that the second gas ejection hole 76 is provided in the gas branching unit 73 in such a way that the shielding gas will be jetted toward the intersection P in a direction whose angle, in the absolute value, to the wire feed direction 81 is larger than 90 degrees when viewed in the direction perpendicular to the base material surface. This positional relationship will be described with reference to FIG. 4. FIG. 4 is a schematic diagram showing the gas branching unit 73 viewed in the direction perpendicular to the base material surface (in the Z-axis direction shown in FIG. 1), and as shown therein, the first gas ejection hole 75 is not formed directly below the wire feed line 72 with respect to the perpendicular viewing direction. With a configuration in which the absolute value of the angle α (when viewed in the direction perpendicular to the base material surface) formed by the wire feed direction 81 and the central axis direction 82 of the first gas ejection hole 75 is smaller than 90 degrees and the absolute value of the angle β (when viewed in the direction perpendicular to the base material surface) formed by the wire feed direction 81 and the central axis direction 83 of the second gas ejection hole 76 is greater than 90 degrees, the wire 2 blocks the shielding gas jetted from the second gas ejection hole 76 toward the intersection P to develop the shadow area B where the supply of the shielding gas is interrupted, whereas the wire 2 does not block the shielding gas jetted from the first gas ejection hole 75 toward the intersection P so that the shadow area B is still able to be supplied with the shielding gas. This means that, in this positional configuration described above, the entire processing area A can be supplied with the shielding gas.

With a configuration as described above, even if the shielding gas jetted from one of the gas ejection holes is blocked by the wire 2 and the shadow area B is generated in the processing area A, the shielding gas jetted from the other gas ejection hole can be supplied to the shadow area B. Therefore, the beads 3 and their vicinity can be fully surrounded by the shielding gas atmosphere, so that the beads 3 and the base material 4 can be prevented form oxidation.

Figure 5:
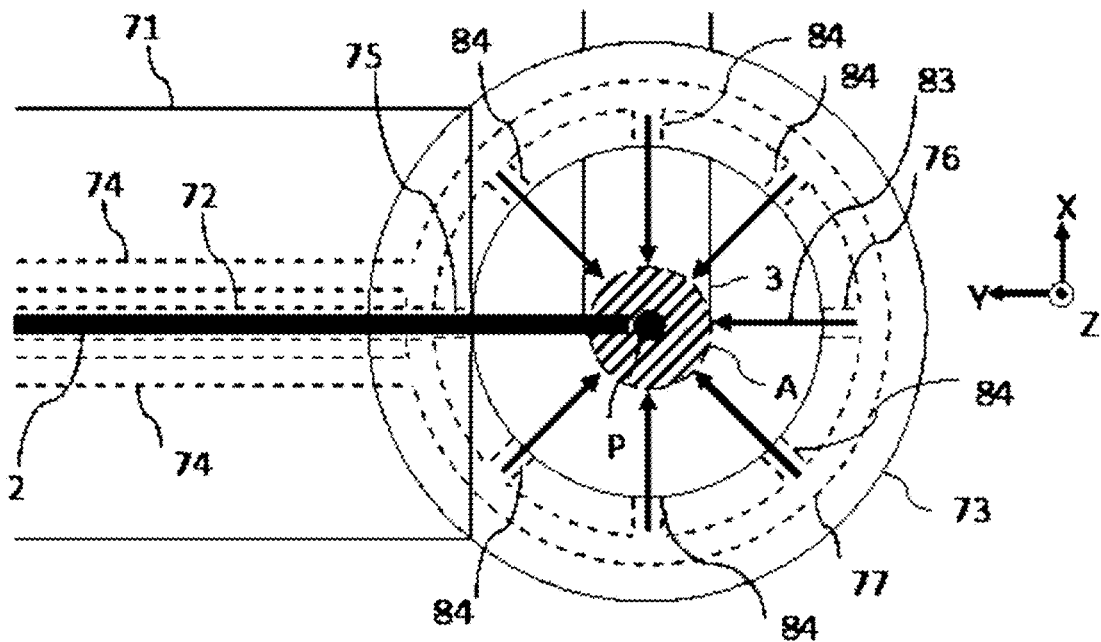
FIG. 5 is a schematic diagram showing a configuration in which the shielding gas nozzle for metal forming according to Embodiment 1 includes a first gas ejection hole, a second gas ejection hole, and fourth gas ejection holes.
Figure 5:
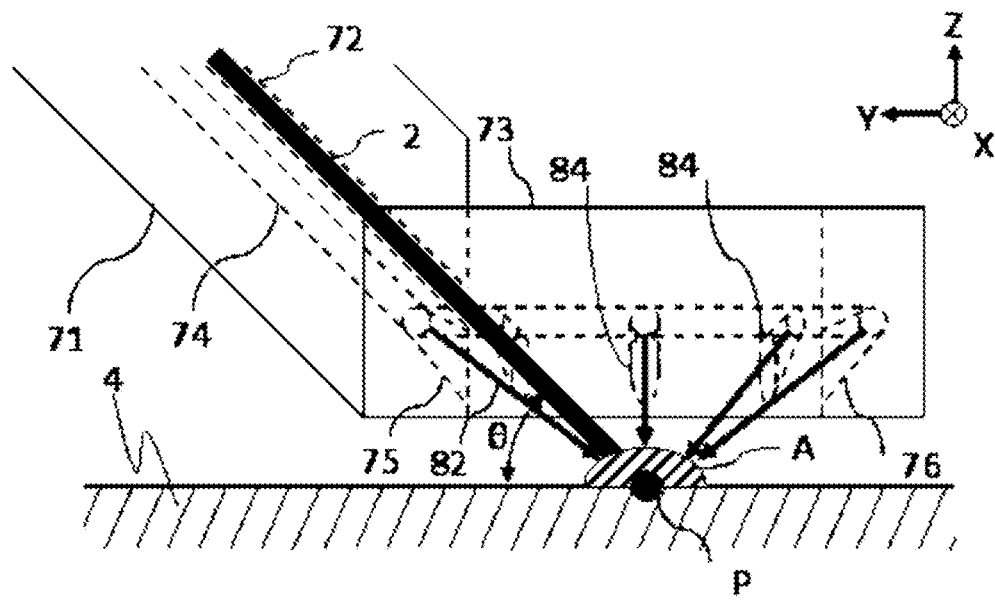

The gas branching unit 73 of a ring shape in plan view with the first gas ejection hole 75 and the second gas ejection hole 76, shown in Embodiment 1 of the present disclosure, is an example of the configurations, and the same effects can be achieved if at least two such gas ejection holes, including the first gas ejection hole 75 and the second gas ejection hole 76, are provided. For example, as shown in FIG. 5, a gas branching unit 73 provided with the first gas ejection hole 75, the second gas ejection hole 76, and a plurality of fourth gas ejection holes 84 for jetting the shielding gas toward the intersection P is also possible. Also, the gas branching unit 73, whose shape is not limited to a ring in plan view exemplified above, may have any shape as long as it meets the following requirements: (a) it does not interfere with the radiation of the laser light 1 onto the processing area A, (b) it has the gas ejection holes to jet the shielding gas toward the processing area A from plural directions, and (c) it can branch the shielding gas to their respective gas ejection holes.

In the present embodiment, a configuration in which the wire feed line 72 and the first gas supply line 74 are integrated is exemplified. However, not only the structure in which the wire feed line 72 and the first gas supply line 74 are integrated, but also the structure in which the wire feed line 72 and the first gas supply line 74 are separated is acceptable.

Figure 6:
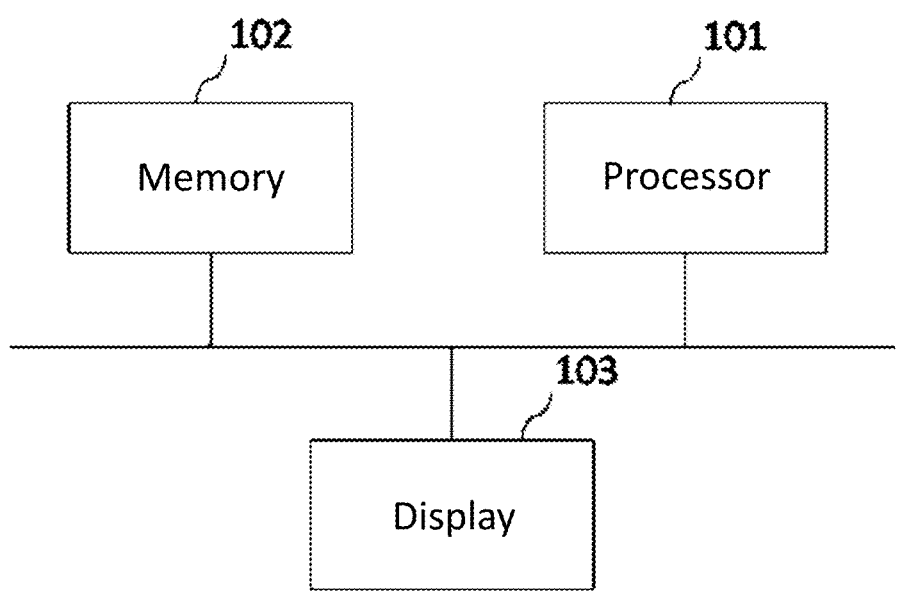
FIG. 6 is a hardware configuration diagram of a controller of the laser metal forming apparatus according to Embodiment 1.

FIG. 6 is a hardware configuration diagram of the controller 20 of the laser metal forming apparatus 100. The function of the controller 20 is performed by a processor that executes a program stored in a memory 102. A processor 101 is a processing device such as a central processing unit (CPU), a processing unit, an arithmetic unit, a microprocessor, a microcomputer, and a digital signal processor (DSP). The function of the controller 20 is realized by cooperation of the processor 101 and software, firmware, or a combination of software and firmware. The software and/or the firmware is written as a program and stored in the memory 102. The memory 102 is a storage device such as a built-in type semiconductor memory, volatile or non-volatile, as exemplified by random access memory (RAM), read only memory (ROM), flash memory, erasable programmable read only memory (EPROM), and electrically erasable programmable read only memory (EEPROM: registered trademark). The display 103 displays information on the control of the laser metal forming apparatus 100 on its screen.

Embodiment 2

In Embodiment 2, a shielding gas nozzle for metal forming that suppresses air approach to the beads and their vicinity and has an even higher antioxidant effect will be described. Description about the same parts as in Embodiment 1 will be omitted and the different parts will be described.

Figure 7:
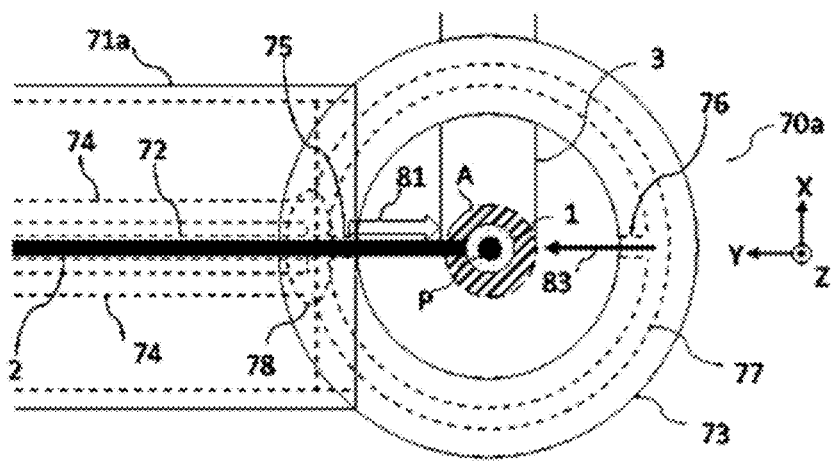
FIG. 7 is a schematic diagram of a shielding gas nozzle for metal forming according to Embodiment 2.
Figure 7:
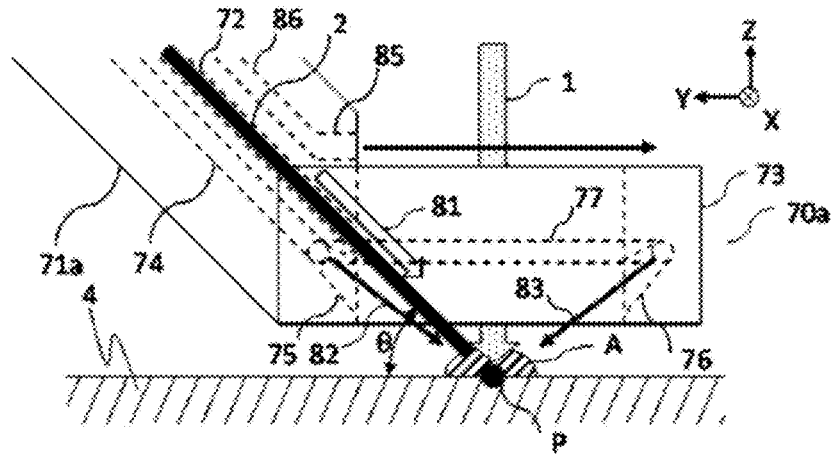
Figure 7:
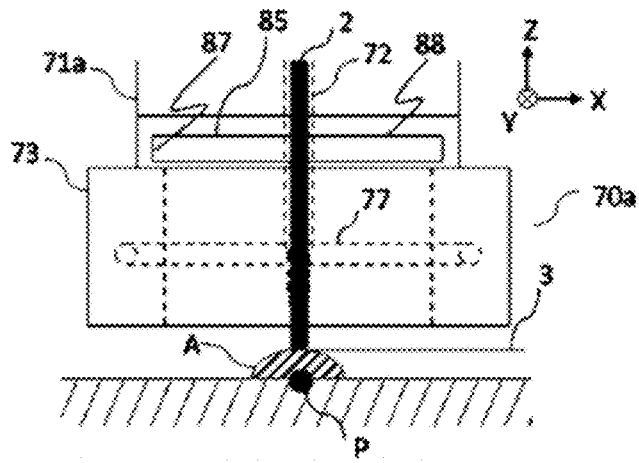

FIG. 7 is a schematic diagram of a shielding gas nozzle 70a for metal forming according to Embodiment 2. FIG. 7(a) is a diagram viewed in the direction perpendicular to the base material surface (in the Z-axis direction shown in FIG. 1); FIG. 7(b) is a diagram viewed in the direction parallel to the base material surface (in the X-axis direction shown in FIG. 1); FIG. 7(c) is a diagram viewed in the direction parallel to the base material surface (in the Y-axis direction shown in FIG. 1).

A nozzle 71a of the shielding gas nozzle 70a for metal forming according to Embodiment 2 is the same as the nozzle 71 of the shielding gas nozzle 70 for metal forming according to Embodiment 1, except that the nozzle 71a further includes: a third gas ejection hole 85 that jets the shielding gas from a position higher than the first gas ejection hole 75 and the second gas ejection hole 76 so as for the jetted shielding gas to pass above the intersection P; and a second gas supply line 86 which is a route to supply the shielding gas to the third gas ejection hole 85. The third gas ejection hole 85 is formed to the nozzle 71a at a position higher than the first gas ejection hole 75 and the second gas ejection hole 76 with respect to the base material surface. The third gas ejection hole 85 creates a gas flow curtain above the intersection P by jetting the shielding gas from this position in the direction parallel to the base material surface.

The shielding gas jetted from the third gas ejection hole 85 is not directly supplied to the processing area A, but acts as a gas curtain, made of the gas flow, that prevents entry of outside air. As a result, it is possible to prevent air entry from directly above the processing area A and thus to stably secure the beads 3 and their vicinity with the shielding gas. The gas flow of the shielding gas jetted from the third gas ejection hole 85 is preferably a laminar flow, which is a smooth and stable flow. Whether the gas flow jetted from the third gas ejection hole 85 becomes a laminar flow or a turbulent flow is determined by the magnitude of Reynolds number expressed by the following equation.

$$Re = \rho \cdot L \cdot U / \mu \qquad \text{Equation (1)}$$

Here, Re is Reynolds number, $\rho$ is gas density [kg/m$^3$], L is representative length [m], U is flow velocity [m/s], and $\mu$ is viscosity coefficient of gas [Pa·s]. For example, when the outlet shape of the third gas ejection hole 85 is a rectangular with a length of $1.0 \times 10^{-3}$ [m] on the short side 87 and a length of $30.0 \times 10^{-3}$ [m] on the long side 88, the aspect ratio is 1:30, which is a sufficiently large aspect ratio. Then, the short side 87 is defined as its representative length L and $L = 1.0 \times 10^{-3}$ [m] holds. Assuming that Re=1000 is a condition yielding a laminar flow, when the shielding gas is argon (Ar) and the temperature is 25 degrees Celsius, then the gas density p is given as 1.076 [kg/m$^3$] and the gas viscosity coefficient $\mu$ is given as $0.0227 \times 10^{-3}$ [Pa·s], so that U is obtained from Equation (1) as about 21 [m/s]. That is, when the shielding gas is jetted from the third gas ejection hole 85 at a flow velocity of about 21 [m/s], the jetted shielding gas can be made laminar. Accordingly, the controller 20 controls the flow velocity of the shielding gas in such a way that the shielding gas jetted from the third gas ejection hole 85 becomes a laminar flow. The outlet shape of the third gas ejection hole 85 is not limited to the shape shown in FIG. 7, but may be any shape as long as the shape gives the Reynolds number, obtained from Equation (1), that yields a laminar flow.

As described so far, according to the present embodiment, a curtain of the gas flow is created above the intersection P by jetting the shielding gas from the third gas ejection hole 85 in the direction parallel to the base material surface. This will increase the air shielding to the processing area and its vicinity to prevent the beads and the base material from oxidizing.

Embodiment 3

In Embodiment 2, the shielding gas nozzle which reduces air approach to the beads and their vicinity and has an even higher antioxidant effect was described. In Embodiment 3, a modification of Embodiment 2 will be described. Description about the same parts as in Embodiment 1 and Embodiment 2 will be omitted and the different parts will be described.

Figure 8:
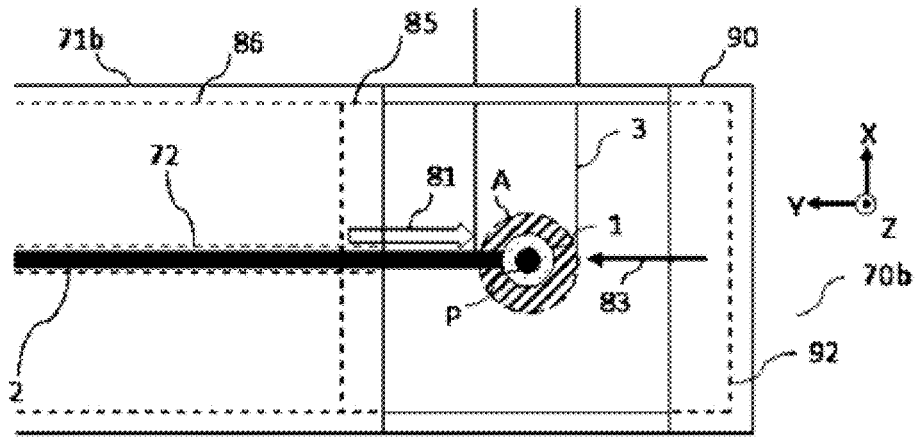
FIG. 8 is a schematic diagram of a shielding gas nozzle for metal forming according to Embodiment 3.
Figure 8:
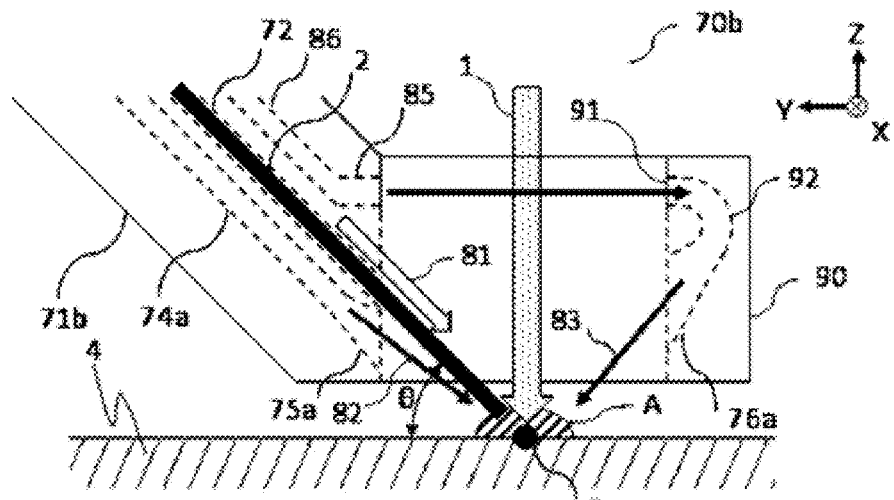
Figure 8:
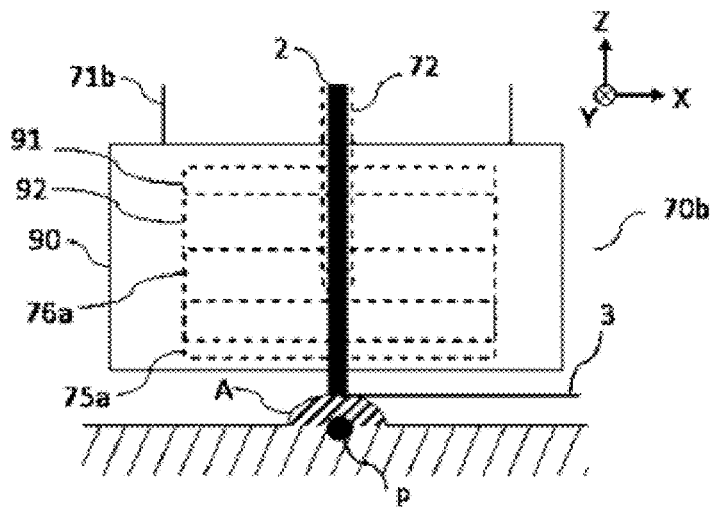

FIG. 8 is a schematic diagram of a typical shielding gas nozzle 70b for metal forming according to Embodiment 3. FIG. 8(a) is a plan view viewed in the direction perpendicular to the base material surface (in the Z-axis direction shown in FIG. 1);

FIG. 8(b) is a side view viewed in the direction parallel to the base material surface (in the X-axis direction shown in FIG. 1); FIG. 8(c) is a side view viewed in the direction parallel to the base material surface (in the Y-axis direction shown in FIG. 1).

A nozzle 71b includes in its inside the wire feed line 72, a first gas ejection hole 75a, a first gas supply line 74a, the third gas ejection hole 85, and the second gas supply line 86. The wire feed line 72 is a path to feed the wire 2 to the processing area A at an inclination angle $\theta$ with respect to the base material surface on which the beads 3 are to be formed. The first gas ejection hole 75a jets the shielding gas to the processing area A. The first gas supply line 74a is a route for supplying the shielding gas to the first gas ejection hole 75a. The third gas ejection hole 85 jets the shielding gas from a position higher than the first gas ejection hole 75a and the second gas ejection hole 76a so as for the jetted shielding gas to pass above the intersection P. The second gas supply line 86 is a route for supplying the shielding gas to the third gas ejection hole 85. The third gas ejection hole 85 is formed to the nozzle 71b at a position higher than the first gas ejection hole 75a and the second gas ejection hole 76a with respect to the base material surface. The third gas ejection hole 85 creates a gas flow curtain above the intersection P by jetting the shielding gas from this position in the direction parallel to the base material surface.

Also, the outlet of the first gas ejection hole 75a is formed closer to the base material surface than the position of the outlet of the wire feed line 72, and is formed in such a way that the shielding gas is jetted toward the intersection P at an angle equal to or less than the inclination angle $\theta$ with respect to the base material surface. The shape of the first gas ejection hole 75a is preferably widened toward its outlet in such a way that the beads 3, including their vicinity, formed on the processing area A will be shielded with the shielding gas.

The shielding gas nozzle 70b for metal forming includes a gas diverting unit 90 that diverts the shielding gas, jetted from the third gas ejection hole 85 to above the processing area A, to re-jet the diverted shielding gas to the processing area A. The gas diverting unit 90 includes the second gas ejection hole 76a, a gas intake 91, and a gas diverting line 92. The second gas ejection hole 76a jets the shielding gas to the processing area A; the gas intake 91 takes in the shielding gas jetted from the third gas ejection hole 85 to above the processing area A; the gas diverting line 92 is a route for diverting the shielding gas taken from the gas intake 91 to supply the diverted shielding gas to the second gas ejection hole 76a. In order for the shielding gas, jetted from the third gas ejection hole 85 to above the processing area A in the direction parallel to the base material surface, to be easily taken into the gas intake 91, the gas intake 91 is formed, in the gas diverting unit 90, at a position on the extension line of the jet direction from the third gas ejection hole 85. The shape of the second gas ejection hole 76a is preferably widened toward its outlet in such a way that the beads 3, including their vicinity, formed on the processing area A will be shielded with the shielding gas.

As described so far, in the present embodiment, the shielding gas is jetted from the third gas ejection hole 85 in the direction parallel to the base material surface, diverted after passing above the intersection P, and then jetted from the second gas ejection hole 76a. This move of the shielding gas creates a curtain of the gas flow above the intersection P, and at the same time, the shadow area is supplied with the shielding gas. As a result, the air shielding to the processing area A and its vicinity is improved, and the oxidation of the beads 3 and the base material 4 can be prevented.

The nozzle 71b with the first gas ejection hole 75a and the gas diverting unit 90 with the second gas ejection hole 76a are shown in Embodiment 3 of the present disclosure. However, this is merely an example, and it is only necessary that at least two or more gas ejection holes, including the first gas ejection hole 75a and the second gas ejection hole 76a, are provided. For example, the nozzle 71b may include another gas ejection hole in addition to the first gas ejection hole 75a; the gas diverting unit 90 may include another gas ejection hole in addition to the second gas ejection hole 76a.

In Embodiment 3 of the present disclosure, the outlets of the first gas ejection hole 75a and the second gas ejection hole 76a each are given a rectangular shape as an example. The outlets of the gas ejection holes each preferably have a rectangular shape, which makes it easy to cover the wide area of the beads and their vicinity with the shielding gas. However, their shapes are not limited to a rectangular shape as long as the beads and their vicinity can be fully surrounded by the shielding gas atmosphere. The outlet shape of the third gas ejection hole 85 is not limited to the shape shown in FIG. 8 as long as the shape gives a Reynolds number yielding a laminar flow when calculated using Equation (1). Further, the flow of the shielding gas jetted from the first gas ejection hole 75a and the second gas ejection hole 76a is preferably a laminar flow, and more preferably a flow that satisfies the desired conditions for the laminar flow described in Embodiment 1.

In the present embodiment, a configuration in which the wire feed line 72 and the first gas supply line 74a are integrated is exemplified. However, the structure is not limited to a structure in which the wire feed line 72 and the first gas supply line 74a are integrated, and may be a structure in which the wire feed line 72 and the first gas supply line 74a are separated.

The configurations shown above in the embodiments are each an example of the contents of the present invention; they can be combined with other known technologies, and part of them can be omitted or changed within the gist of the present invention.

DESCRIPTION OF THE SYMBOLS 1 laser light,
2 wire,
3 beads,
4 base material,
5 stage,
6 laser head,
7 light transmission path,
10 laser oscillator,
20 controller,
30 processing head,
31 processing-head's main body,
40 wire feeder,
50 shielding gas supplier,
60 drive unit,
61 X-axis driver,
62 Y-axis driver,
63 Z-axis driver,
70,70a,70b shielding gas nozzle for metal forming,
71,71a,71b nozzle,
72 wire feed line,
73 gas branching unit,
74,74a first gas supply line,
75,75a first gas ejection hole,
76,76a second gas ejection hole,
77 branched gas supply line,
78 gas branching spot,
81 wire feed direction,
82 central axis direction of first gas ejection hole,
83 central axis direction of second gas ejection hole,
84 fourth gas ejection hole,
85 third gas ejection hole,
86 second gas supply line,
87 short side,
88 long side,
90 gas diverting unit,
91 gas intake,
92 gas diverting line,
100 laser metal forming apparatus,
101 processor,
102 memory,
103 display,
A processing area,
B shadow area,
P intersection

The invention claimed is:

1. A shielding gas nozzle for metal forming, comprising:
a wire feed line being a path to feed a wire at an inclination angle θ to a base material surface;
a first gas ejection hole to jet shielding gas for preventing oxidation of beads at an angle equal to or less than the inclination angle θ to the base material surface; and
a second gas ejection hole to jet the shielding gas to the base material surface in a direction different from a jet direction of the first gas ejection hole to the base material surface, wherein
a wire feed direction in which the wire is fed, a central axis direction of the first gas ejection hole, and a central axis direction of the second gas ejection hole intersect with each other at an intersection lower than the first gas ejection hole and the second gas ejection hole,
the first gas ejection hole jets the shielding gas toward the intersection along a direction in which an absolute value of an angle to the wire feed direction when viewed in a direction perpendicular to the base material surface is less than 90 degrees, and
the second gas ejection hole jets the shielding gas toward the intersection along a direction in which an absolute value of an angle to the wire feed direction when viewed in the direction perpendicular to the base material surface is greater than 90 degrees.

2. The shielding gas nozzle for metal forming according to claim 1, further comprising a third gas ejection hole for jetting the shielding gas from a position higher than the first gas ejection hole and the second gas ejection hole in such a way that the jetted shielding gas therefrom passes above the intersection.

3. The shielding gas nozzle for metal forming according to claim 2, further comprising:
a gas intake to take in the shielding gas jetted from the third gas ejection hole; and
a gas diverting line being a route to divert a direction of the shielding gas taken in from the gas intake to supply to the second gas ejection hole.

4. The shielding gas nozzle for metal forming according to claim 1, further comprising:
a gas branching unit to branch the shielding gas and jet it from plural directions to the intersection; and
a first gas supply line being a route to supply the shielding gas to the gas branching unit,
wherein the gas branching unit comprises: the first gas ejection hole; the second gas ejection hole; and a branched gas supply line being a route to branch and supply the shielding gas to the first gas ejection hole and the second gas ejection hole.

5. The shielding gas nozzle for metal forming according to claim 2, further comprising:
a gas branching unit to branch the shielding gas and jet it from plural directions to the intersection; and
a first gas supply line being a route to supply the shielding gas to the gas branching unit,
wherein the gas branching unit comprises: the first gas ejection hole; the second gas ejection hole; and a branched gas supply line being a route to branch and supply the shielding gas to the first gas ejection hole and the second gas ejection hole.

6. The shielding gas nozzle for metal forming according to claim 4, wherein the gas branching unit has a ring shape centered on the intersection when viewed in the direction perpendicular to the base material surface.

7. The shielding gas nozzle for metal forming according to claim 1, wherein the first gas ejection hole and the second gas ejection hole have a shape widened toward their respective outlets.

8. The shielding gas nozzle for metal forming according to claim 2, wherein the first gas ejection hole and the second gas ejection hole have a shape widened toward their respective outlets.

9. The shielding gas nozzle for metal forming according to claim 3, wherein the first gas ejection hole and the second gas ejection hole have a shape widened toward their respective outlets.

10. The shielding gas nozzle for metal forming according to claim 4, wherein the first gas ejection hole and the second gas ejection hole have a shape widened toward their respective outlets.

11. The shielding gas nozzle for metal forming according to claim 6, wherein the first gas ejection hole and the second gas ejection hole have a shape widened toward their respective outlets.

12. A laser metal forming apparatus to heat and melt a wire with laser light to deposit beads, the laser metal forming apparatus comprising the shielding gas nozzle for metal forming according to claim 1, wherein the position of the shielding gas nozzle for metal forming is controlled in such a way that the position of the intersection is brought in a processing area where the beads are freshly deposited by heating and melting the wire, and the laser light is radiated toward the intersection.

13. A laser metal forming apparatus to heat and melt a wire with laser light to deposit beads, the laser metal forming apparatus comprising the shielding gas nozzle for metal forming according to claim 2, wherein the position of the shielding gas nozzle for metal forming is controlled in such a way that the position of the intersection is brought in a processing area where the beads are freshly deposited by heating and melting the wire, and the laser light is radiated toward the intersection.

14. A laser metal forming apparatus to heat and melt a wire with laser light to deposit beads, the laser metal forming apparatus comprising the shielding gas nozzle for metal forming according to claim 3, wherein the position of the shielding gas nozzle for metal forming is controlled in such a way that the position of the intersection is brought in a processing area where the beads are freshly deposited by heating and melting the wire, and the laser light is radiated toward the intersection.

15. A laser metal forming apparatus to heat and melt a wire with laser light to deposit beads, the laser metal forming apparatus comprising the shielding gas nozzle for metal forming according to claim 4, wherein the position of the shielding gas nozzle for metal forming is controlled in such a way that the position of the intersection is brought in a processing area where the beads are freshly deposited by heating and melting the wire, and the laser light is radiated toward the intersection.

16. A laser metal forming apparatus to heat and melt a wire with laser light to deposit beads, the laser metal forming apparatus comprising the shielding gas nozzle for metal forming according to claim 6, wherein the position of the shielding gas nozzle for metal forming is controlled in such a way that the position of the intersection is brought in a processing area where the beads are freshly deposited by heating and melting the wire, and the laser light is radiated toward the intersection.

17. A laser metal forming apparatus to heat and melt a wire with laser light to deposit beads, the laser metal forming apparatus comprising the shielding gas nozzle for metal forming according to claim 7, wherein the position of the shielding gas nozzle for metal forming is controlled in such a way that the position of the intersection is brought in a processing area where the beads are freshly deposited by heating and melting the wire, and the laser light is radiated toward the intersection.

18. A laser metal forming apparatus to heat and melt a wire with laser light to deposit beads, the laser metal forming apparatus comprising the shielding gas nozzle for metal forming according to claim 8, wherein the position of the shielding gas nozzle for metal forming is controlled in such a way that the position of the intersection is brought in a processing area where the beads are freshly deposited by heating and melting the wire, and the laser light is radiated toward the intersection.

19. A laser metal forming apparatus to heat and melt a wire with laser light to deposit beads, the laser metal forming apparatus comprising the shielding gas nozzle for metal forming according to claim 2, wherein a flow velocity of the shielding gas is controlled in such a way that the shielding gas jetted from the third gas ejection hole becomes a laminar flow.

20. A laser metal forming apparatus to heat and melt a wire with laser light to deposit beads, the laser metal forming apparatus comprising the shielding gas nozzle for metal forming according to claim 3, wherein a flow velocity of the shielding gas is controlled in such a way that the shielding gas jetted from the third gas ejection hole becomes a laminar flow.

* * * * *